July 21, 1931. W. R. WILEY 1,815,690
CATCH FOR MOTOR VEHICLE HOODS
Filed Dec. 6, 1929 2 Sheets-Sheet 1
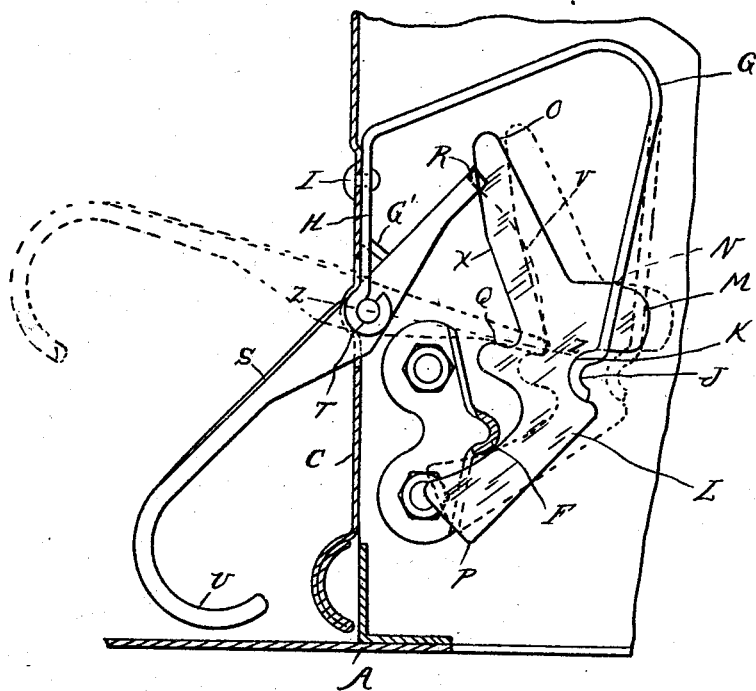
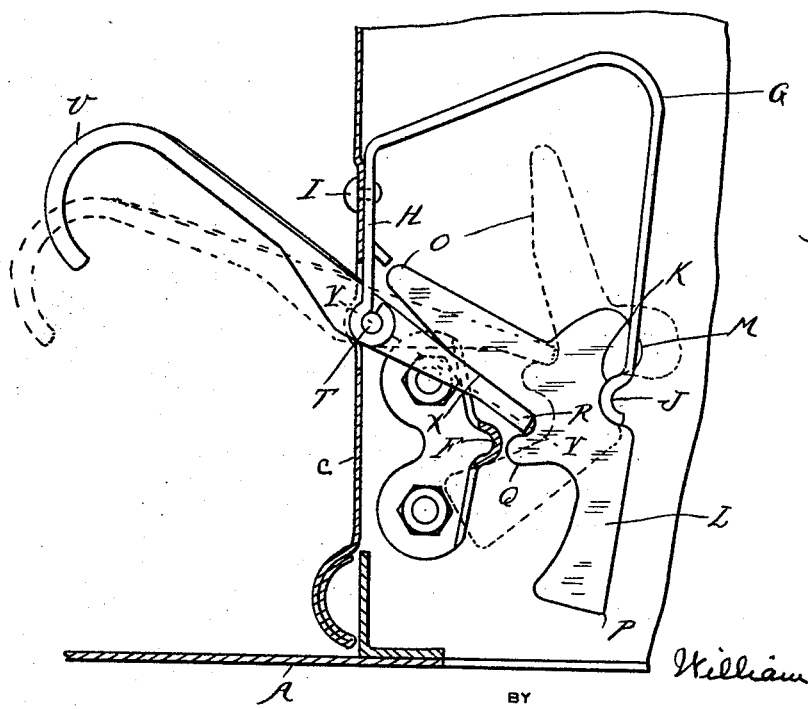
INVENTOR
William R. Wiley
BY Swan and Frye
ATTORNEYS July 21, 1931.  W. R. WILEY  1,815,690
CATCH FOR MOTOR VEHICLE HOODS
Filed Dec. 6, 1929  2 Sheets-Sheet 2
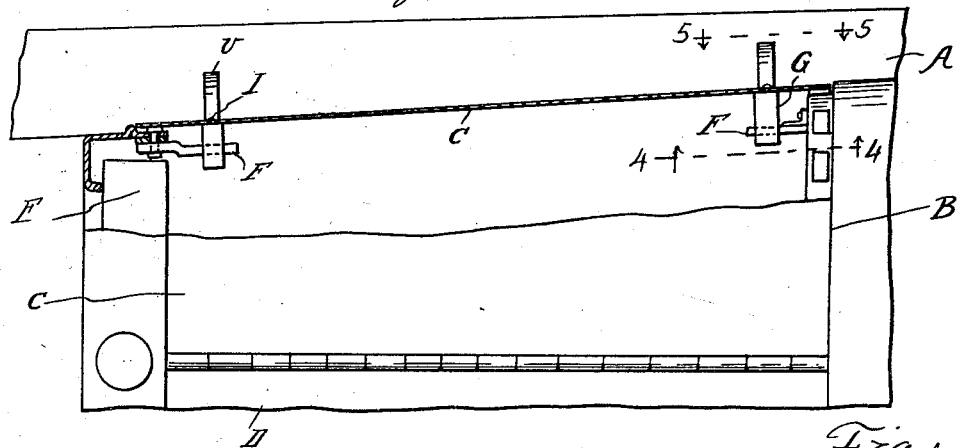
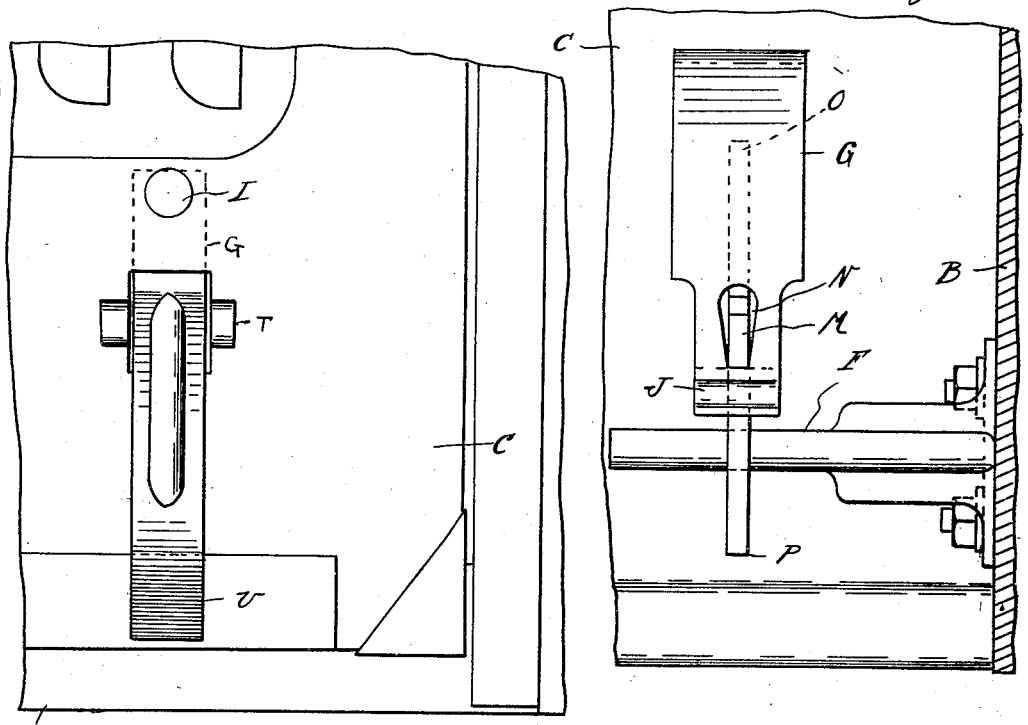
INVENTOR
William R. Wiley
BY
Stevan and Frye
ATTORNEYS Patented July 21, 1931

1,815,690

UNITED STATES PATENT OFFICE

WILLIAM R. WILEY, OF DETROIT, MICHIGAN

CATCH FOR MOTOR VEHICLE HOODS

Application filed December 6, 1929. Serial No. 412,013.

This invention relates to hood catches for the engine hoods of motor vehicles, and has for its object an improved organization of parts by means of which the hood panels which are hinged or otherwise supported at their meeting top edges over the engine block may be firmly secured at their lower edges to the chassis of the vehicle or such supported structural parts thereof as the dash or radiator, in order to reduce to a minimum the possibility of rattling, while at the same time being easily detachable by manual pull upon the projecting outer handle portion of each catch, preliminary to the lifting of the supporting hood wall. The improved organization of parts here to be described represents an effort to get away from the much used though concededly unsatisfactory type of hood catch wherein a pivotally anchored hook is yieldingly held against drawing movement axially lengthwise of itself such as is necessary for the lifting of the point of the hook into holding engagement with a suitable complementary or equivalent anchorage.

In the drawings:

Figure 1 is an elevational view partly in section and practically in full size, showing one of my improved devices in position relatively to a hood wall and vehicle chassis, which are shown sectionally.

Figure 2 is a similar view, but with the parts in different operative relation, in that the full-line representation of the externally projecting handle there shown is in raised position, and the internally located operative parts are in variant positions accordingly.

Figure 3 is a plan view from above of one half of a motor vehicle hood and the adjacent chassis parts, showing the positioning of my improved catch with reference thereto.

Figure 4 is a partly sectional elevational view on substantially the same scale as Figures 1 and 2, taken along the line 4—4 of Figure 3, and looking outwardly therefrom, as indicated by the arrows there shown.

Figure 5 is a similar elevational view taken along the line 5—5 of Figure 3 and looking inwardly, as indicated by the arrows there shown.

A represents a motor vehicle chassis, and B the dash against which abuts one marginal edge of each of the hingedly correlated hood walls, C and D, which arch over either side of the engine block. In conformity with the usual practice, I have shown two of my improved catch constructions as applied to the lower edge of each one of the hood walls C and D, one catch element near the forward edge thereof, that is, just behind the radiator E, and the other near the rear edge thereof, just in front of the dash B; quite probably under some circumstances one catch for each hood wall section would suffice. Adjacent each one of these positions there projects from either the dash B or the radiator E or if preferred from the vehicle frame itself a fixed anchorage stem F whose suitably tapering end portion crosses the path of operative travel of the corresponding hood catch and serves as an anchorage therefor, as will be hereinafter further explained.

Each hood catch construction consists essentially of a generally three-sided or squared U-shaped resilient member G, one section of which, as H, is adapted to be secured to the hood wall, as C, by the rivet or bolt I. The opposite end of this U-shaped member G is preferably formed with a slightly inbent curve, as J, which is of the same general contour as the corresponding recess K in the irregularly shaped lever piece L, a nose or projecting portion of which, as M, engages through a slot N in that portion of the spring piece G next adjacent its curved terminal J just mentioned. As brought out particularly in elevational Figures 1 and 2, the other salient features of this lever piece L comprise terminal parts O and P and an intermediate peninsula-like tongue or projections Q, which extends from the generally concaved side of the irregular lever piece L as a whole.

As brought out by the respective positioning of the full and dotted lines representing this lever piece in Figures 1 and 2, it is limitedly actuatable about its indented or curved face K and the corresponding spring end J as a turning center, under actuation of the engaging and slightly kerfed end R of the hand lever S, which is pivoted at T to the end of the U-shaped spring G just inside the hood wall, so that its hand or finger portion U projects outwardly for seizure by the user.

The full line positions of the lever L and the handle S, shown in Figure 1, represent these parts in relation to one another and to the hood wall when the device is in locking position, that is, with the lower end P of the lever L engaging tightly under the anchorage stud F, which is secured to either the radiator or the dash, depending upon which one of the devices is looked upon as under consideration. When the pivoted handle S is raised by upward draw upon its projecting outer end U, its kerfed end R wipingly engages against the surface X of the lever L, the path of the extreme tip of the kerfed end R of the lever S relatively to the branch N of the lever L being indicated by the dotted line V in Figure 1. When the draw upon the lever S has made it reach the position shown in dotted lines in Figure 1, its kerfed inner end R has lodged in the little bay or recess formed by the side X of the lever L already referred to and the small projections Q. In such position it will be noted, from the position of the dotted line Z—Z in Figure 1, that the pivot T of the lever S, the kerfed end R thereof and the curved pivotal or turning surface K are not quite in alignment, in other words, the lever S has not yet effected enough of a turning to displace the lower end P of the lever L from holding position relatively to the projecting stud F. The position thus far attained by the lever S, as indicated by dotted lines in Figure 1, is correspondingly indicated in dotted lines in Figure 2, whereas the slight further or overthrowing position thereof needed to effect the definite throw of the lever L to a position where its lower end P will no longer anchoringly engage the stud F, is indicated in full lines slightly thereabove. This slight additional draw upon the lever S, needed to effect this, has imposed a very definite and positive strain upon the peninsula-like projection Q, by the kerfed end R of the lever S, which results in throwing the whole lever piece L in a general downward direction about its curved face K and the corresponding curved end J of the spring G as a center, thus resulting in throwing the lower end P of the lever L definitely clear of the anchorage stud F, so that when the hood wall is thereafter lifted the lever end P will pass entirely outside of its range. It will also be noted from a study of the position of the line Y—Y in Figure 2, representing the line through the pivot T of the lever S and through the then position of its kerfed end R, that these points are both very definitely out of alignment with the curved turning face K, thus having effected the snap overthrow desired for the positive action of the hood catch.

The line of demarcation thus defined between the positions indicated by the lines Z—Z and Y—Y and the disclosed structure relating thereto is here emphasized largely for reasons of compactness of structure and convenience of arrangement, since it will be obvious that, if desired, and without departure from the spirit of my invention the position indicated by the line Z—Z might be moved to coincidence with the actual overthrow position indicated by the line Y—Y. In other words, if the relative position of the projection Q on the lever L as a whole were to be moved somewhat downwardly, thus making the branch O of the lever L that much longer and the lower branch P accordingly shorter, the overthrow action would take place automatically and without the described further manual draw upon the lever S. This would however, in turn require a heavier, stronger spring G, due to the change in leverage which this change would occasion. Thus the greater the disparity in length of the two lever sections O and P, the greater will be the strength of draw by the lower, anchorage-engaging portion P against the under side of the stem F.

The hand-induced downward movement of the pivoted lever S, when the locking of the hood wall is desired, effects just the opposite of the movements already described, in that its kerfed end R wipingly and liftingly engages the edge X of the lever L, ultimately moving away from its contact with the peninsula-like portion Q, and effecting a swing of the lever L back to the position shown in dotted lines in Figure 2 and in full lines in Figure 1, thus bringing its lower end P in anchoringly subjacent position with respect to the anchorage stud F. If desired a small struck-up portion as G' of the spring G may be formed to project into the path of upward swing of the lever S, to prevent its swinging ascent to an undesired degree.

It will thus be noted that not only is firmness of anchorage and quick detachability of the parts thus reliably effected, but as well that no part of the lifting strain due to the hand-induced swing of the lever S is transferred to the hood wall C or D as such, since all of the strains represent in their last analysis merely a flexing of the generally U-shaped spring G, one side only of which, as H, is for structural reasons, attached to the hood wall. The inwardly swinging position of the lower end P of the lever L, when the catch as a whole is in detached position relatively to the anchorage stud F, makes this lower end P act as a guard against improper lowering or positioning of the hood wall when its re-locking is desired, since only when the lever end P is swung adequately far back from the hood wall can the latter be lowered without the lower lever end P striking the top of the anchorage piece F and thus interfering with the further lowering of the hood wall. If the hood wall should be so carelessly lowered as to throw the lever end P quite to the outside of the anchorage F, it prevents the hood wall from being pushed inwardly, thus calling attention to the necessity of re-lifting the hood wall and lowering it in its proper plane.

I have shown the lever S as pivotally supported at T by the hood-wall-engaged end of the curved spring G, which is a preferable construction, in that, as heretofore emphasized, such a construction imposes all of the operative stresses upon the spring, thus making the organization of parts really self-contained, and consequently relieving the hood wall itself of such strains, I desire it to be understood, however, as clearly within the intended scope of this disclosure to position the pivotal support of the hand lever S upon the hood wall. Similarly, the main portion of the spring G might be made quite rigid functioning as a sort of frame while supporting spring elements at its ends, against whose resilient draw the described action of the lever members would take place in the same manner as already described.

What I claim is:

1. A hood catch adapted for operative attachment to a hood wall, comprising, in combination with an anchorage element fixedly supported from a conveniently adjacent part of a vehicle frame, a generally U-shaped resilient member, one branch of which is adapted to be secured to the hood wall adjacent an apertured portion thereof, a lever member operatively supported from the opposite section of said resilient member and capable of limited movement in a plane generally coincident with the plane of said resilient member as a whole, and an operating lever extending through the aperture in the hood wall and operatively engaging with its inner end a selected portion of said first named lever member, which latter is adapted to be moved into and out of holding engagement with said anchorage element by the manually actuated swing of said operating lever.

2. In a hood catch, in combination with a suitably positioned anchorage element, a plurally bent spring member one portion of which is adapted to be secured to the inner face of a hood wall adjacent an aperture therein, an operating lever pivotally supported from said secured branch of said spring member and extending through the aperture in the hood wall for manual seizure, and a limitedly movable lever member operatively engaged by the interiorly projecting end of said operating lever and rockingly supported by the inwardly projecting free end of said spring member, adapted to be thrown into and out of engagement with said anchorage element by manually induced movement of said operating lever.

3. In a hood catch, in combination with a generally arching spring member one terminal portion of which is adapted to be secured to a hood wall adjacent an aperture therein, an operating lever pivotally supported by the secured end of said spring member and having a manually seizable portion extending through the aperture in the hood wall, a second lever member supported by the free end of said spring member in a plane substantially coincident with that of said operating lever and of said spring member as a whole, adapted to be swung into and out of engagement with a suitably positioned anchorage element by the manually induced swing of said operating lever.

4. A self-contained catch member for motor vehicle hoods, having in combination a generally U-shaped spring member, one leg of which is adapted to be supported from the inner face of the hood wall, a lever member pivotally supported in a plane substantially coincident with that of said spring member as a whole adjacent the free opposite end thereof from that which is connected with the hood wall, and an operating lever pivotally supported at the hood-supported end of said spring member and operatively engaging said first named lever member, the manually seizable portion of said operating lever extending through an aperture in the hood wall and the actuation of said first named lever member into and out of engagement with a suitably located anchorage element brought about by the manual actuation of said operating lever.

5. In a hood catch, in combination with a generally U-shaped spring member adapted to supportedly project from the inner face of a hood wall, an operating lever pivotally supported intermediate its ends from the supported end of said spring member in a plane substantially coincident with that of the latter as a whole, and a lever member operatively engaged by the inner end of said operating lever and supported in position of limited rocking movement by the free end of said spring member, adapted to be swung by manual actuation of the outwardly projecting end of said operating lever into and out of engagement with a correspondingly positioned anchorage element.

6. A self-contained spring catch for a motor vehicle hood, having in combination with a spring member one end of which is adapted to be attached to the hood wall adjacent an apertured portion thereof, a pair of operatively correlated lever members supported by the opposingly located ends of said spring member, one end of one of said levers engaging through the hood wall for external manual actuation while its other end is adapted to act upon the other lever in opposition to its resilient support by the spring, the degree of the opposition thus encountered by it as it traverses the engaged part of the other lever being in inverse proportion to the relative swinging movement of the two levers at any point in their respective paths of travel.

7. In combination with an anchorage element supported by a fixed portion of a motor vehicle structure, a lever member having a portion adapted to lockingly engage with said anchorage element, a curved spring member adapted to afford a pivotal and resilient support to said lever with one of its ends, the other end of said spring member being supported from a hood wall of the vehicle with reference to the intended position of which said anchorage element is located, a manually actuatable lever supported adjacent the wall-supported end of said curved spring with one end projecting through the hood wall in position for selective manual actuation and with its other end in position of potential wiping engagement with a certain portion of said first-named lever, whereby the latter is actuatable against the resilient confining action of said curved spring member into and out of operative engagement with said anchorage element to a degree inversely proportional to the movement of the hand-actuated lever.

In testimony whereof I sign this specification.

WILLIAM R. WILEY.